United States Patent [19]
Pawlowski et al.

[11] Patent Number: 5,788,753
[45] Date of Patent: Aug. 4, 1998

[54] POLYAMINES COMPLEXED TO ANIONIC DYES, THEREBY FORMING WATER-SOLUBLE CATIONIC DYES

[75] Inventors: Norman E. Pawlowski; David J. Halko; Joseph W. Tsang; Kimberly L. Hockaday Dahm, all of Corvallis, Oreg.

[73] Assignee: Hewlett-Packard Company, Palo Alto, Calif.

[21] Appl. No.: 738,532

[22] Filed: Oct. 28, 1996

[51] Int. Cl.$^6$ ............................................. C09D 11/02
[52] U.S. Cl. ...................... 106/31.43; 106/31.57; 106/31.58; 106/31.59
[58] Field of Search .................. 106/22 H, 20 D, 106/31.43, 31.57, 31.58, 31.59

[56] References Cited

U.S. PATENT DOCUMENTS

| | | | |
|---|---|---|---|
| 4,155,768 | 5/1979 | Adams | 106/22 H |
| 4,197,135 | 4/1980 | Bailey et al. | 106/22 H |
| 4,267,088 | 5/1981 | Kempf | 260/29 |
| 4,664,708 | 5/1987 | Allen | 106/22 R |
| 4,789,400 | 12/1988 | Solodar et al. | 106/22 H |
| 5,017,644 | 5/1991 | Fuller et al. | 524/612 |
| 5,026,425 | 6/1991 | Hindagolla et al. | 106/22 R |
| 5,098,474 | 3/1992 | Pawlowski et al. | 106/22 H |
| 5,129,948 | 7/1992 | Breton et al. | 106/22 H |
| 5,223,028 | 6/1993 | Aulick et al. | 106/22 H |
| 5,254,159 | 10/1993 | Gundlach et al. | 106/22 H |
| 5,342,439 | 8/1994 | Lauw | 106/22 H |
| 5,352,283 | 10/1994 | Beach et al. | 106/22 H |
| 5,482,545 | 1/1996 | Aoki et al. | 106/22 H |
| 5,503,666 | 4/1996 | Mennicke et al. | 106/22 H |
| 5,534,052 | 7/1996 | Mennicke et al. | 106/22 D |

*Primary Examiner*—Helene Klemanski

[57] ABSTRACT

An ink-jet ink for ink-jet printers is provided, comprising: (a) an aqueous-based vehicle; and (b) an anionic dye complexed with a polyamine in an amount sufficient to form a pH-insensitive, water-soluble, dye:polyamine complex that acts like a cationic dye. Further, a method of converting the anionic dye to the cationic dye for formulating the ink-jet ink having a desired pH is provided. The method comprises adding a sufficient amount of the polyamine to form the dye:polyamine complex. The dye:polyamine complex is a complex of the dye and the polyamine polymer, which is cationic. Consequently, this complex behaves as a cationic dye. These ink-jet inks show remarkable waterfastness on a variety of common office papers and are pH-insensitive and even in some cases, completely pH-independent. These inks are thus stable over a wide pH range. In addition, the ink-jet inks exhibit superior ink-to-ink bleed when printed next to a drop of another color ink which contains an anionic polymer or carboxylated colorant and resist crusting or drying in ink-jet nozzles.

23 Claims, 2 Drawing Sheets

POLYAMINES COMPLEXED TO ANIONIC DYES, THEREBY FORMING WATER-SOLUBLE CATIONIC DYES

TECHNICAL FIELD

The present invention relates generally to inks used in ink-jet printers, and, more particularly, to the use of polymers to form complexes with dyes in such inks.

BACKGROUND ART

A well-known approach to anyone skilled in the art of ink making is the addition of various polymers to ink. A polymeric system which would appear particularly attractive are the polyethylenimines (PEIs), which are a class of polyamines. Many ink makers have attempted to add such a polymer. However, they experienced problems as revealed in the following patents which are briefly reviewed below. A major problem is that PEIs have relatively high pKas, and become cationic polymers at relatively high pH. As a result, inks containing anionic dyes and made with these cationic polymers precipitate at a pH of approximately 8. Most ink-jet cartridge materials are not compatible with inks which have a pH above 8, and a pH of 8 leaves no margin for pH drift. The present invention is directed to a method for complexing PEIs to anionic dyes, converting them to polymer-dye complexes, probably cationic complexes, which are pH-insensitive. These polymer-dye complexes disclosed in accordance with the present invention (1) exhibit good waterfastness on common office papers, (2) exhibit superior ink-to-ink bleed when printed next to a drop of another color ink which contains an anionic polymer or carboxylated colorant, and (3) resist crusting or drying in ink-jet nozzles.

D. A. Allen in U.S. Pat. No. 4,664,708, issued May 12, 1987, mixes PEI with reactive dyes and assumes that the two chemically bonded (which they probably do). The purpose of this method is to obtain waterfastness. These dyes lose solubility as the pH is lowered, generally around pH 8, and Allen asserts that his inks have a pH in the range of 9 to 12, and preferably in the range of 9 to 10. The lowering of pH after printing on paper causes the dye:amine zwitterion to precipitate on the paper, resulting in waterfastness. The disadvantage of this system is that inks must be kept very basic, and if the pH drifts down on storage (e.g., due to carbon dioxide, other atmospheric oxide, or acid air absorption), dye precipitation can occur, leading to possible nozzle plugging. Another disadvantage is that the ink maker must use a reactive dye, or make a dye reactive, and run the reaction, which may give by-products harmful to ink-jet printer materials.

G. M. Adams et al in U.S. Pat. No. 4,155,768, issued May 22, 1979, uses a polyamine containing 6 or fewer nitrogens atoms per molecule as an additive. The patentees make a point that by using these small polyamines, they are able to adjust pH to below 8, and particularly to 7. They state "It is preferred that none of the amine functionalities be primary. The preferred polyamine is permethylated tetraethylenepentamine." A significant point is that their polyamines must be permethylated to lower the pH below 8. This is only a small pH reduction beyond Allen's patent above. It remains a situation where polyamines precipitate dyes at pH approaching neutral. It appears that the patentees have slightly changed the pKa of the polyamine.

W. D. Bailey et al in U.S. Pat. No. 4,197,135, issued Apr. 8, 1980, follow up by claiming that polyamines containing 7 or more nitrogen atoms achieve a pH of 8 in their inks. However, the description of the invention adjusts the pH from 11 down to 10.

P. S. Kempf in U.S. Pat. No. 4,267,088, issued May 12, 1981, claims advantages to using a mixture of epichlorhydrin-modified PEI and an ethylene oxide-modified PEI, which hardens on paper and other surfaces. Still, he uses high pH inks. Epichlorhydrin treatment of a PEI would have more impact on its pKa than in the Adams et al patent above.

W. E. Solodar et al in U.S. Pat. No. 4,789,400, issued Dec. 6, 1988, use hydroxypropylated PEI. The patentees point out that hydroxypropylated PEIs are not available commercially, but give no other formulation secrets, tricks, or techniques. Again, this treatment would have a small affect on lowering the pKa of the PEI, if there is any advantage to this technique.

T. J. Fuller et al in U.S. Pat. No. 5,017,644, issued May 21, 1991, claim linear N-hydroxy substituted PEI, and assert that the linear molecule improves everything imaginable over other inventions that use branched PEI. Specific properties associated with many of the ink compositions of this invention include a pH range of 7 to 10, preferably from 8.6 to 9.0. No gain in pH advantage is claimed, however.

S. L. Hindagolla in U.S. Pat. No. 5,026,425, issued Jun. 25, 1991, and assigned to the same assignee as the present invention, uses ammonium or volatile amine with polyfunctional amine (PEI) and Direct Black 168. The pH of inks is about 8. Loss of ammonium or volatile amine lowers pH, causing the dye-polyfunctional amine to precipitate which is the same mechanism exploited in the above patents, except the volatile ammonia or amine in this patent accelerates the lowering of pH on paper.

Similarly, R. O. Aulick et al in U.S. Pat. No. 5,223,028, issued Jun. 29, 1993, use hydroxyethylated polyethylenimine and ammonium salt of the dye to obtain a waterfast ink, which is stable at a lower pH than other inventions. According to the patentees, other inventions using PEI require high pH to stabilize the ink. They reason that waterfastness is the result of an anionic dye:PEI complex that precipitates when the PEI becomes cationic due to protonation, near its pKa. Hydroxyethylated PEI has a pKa lower than other amines (polyamines), thus one can make lower pH inks, according to the patent, but low pH inks lose their waterfastness properties. With the hydroxyethylated PEI and dye as its ammonia salt, the pH drops on paper causing the hydroxyethylated PEI-dye complex to form, providing waterfastness. Although Aulick et al call their result a "complex", it is still a precipitate.

All precipitates are technically "complexes" but not in the sense used in herein. Aulick et al have not formed a stable water soluble complex as is done herein. Rather, Aulick et al have repeated the Hindagolla patent in combination with a new modified PEI, but there is nothing new from all the other patents above.

K. B. Gundlach et al in U.S. Pat. No. 5,254,159, issued Oct. 19, 1993, claim ink formulations and specific formulations with an extensive list of amines, and specific formulations with an extensive list of dyes and co-solvents. Other than listing names of specific chemicals, it is difficult to understand if there is anything new or unique claimed in this invention. Like other inventions, these inks are utilize at above pH 8.

All of the above inks disclosed in the above patents must be kept at relatively high pH, above pH 7, and usually above pH 8 to prevent them from precipitating from ink solution. Thus, all of the above-referenced patents disclose inks that are pH-sensitive. The patentees of these prior patents utilizing PEIs believe and claim that a pH change on paper (which apparently happens spontaneously) is responsible for their waterfastness properties. Their failure to understand the mechanism of PEI binding to paper for waterfastness probably does not adversely affect their patents. However, it is clear that a pH-independent ink utilizing PEI and substituted PEI, has not been disclosed.

It is clear that adding PEI and other polymers is a well-known developmental procedure to anyone skilled in the art of ink making, and many inks prior to ink-jet inks contained polymers of many types. However, the above-discussed patents, which are directed to disclosing the addition of PEIs to ink-jet inks, reveal that the ink makers were plagued by the problem of precipitation in the ink at moderate pH. Materials used to manufacture ink-jet cartridges are not compatible with high pH inks. The knowledge and method of forming a pH-insensitive, water-soluble, dye:PEI complex, which is disclosed herein, are apparently not disclosed in the art and hence are considered to be unobvious to someone skilled in the art of ink making.

DISCLOSURE OF INVENTION

In accordance with the invention, an ink-jet ink for ink-jet printers is provided, comprising:

(a) an aqueous-based vehicle; and (b) an anionic dye complexed with a polyamine in an amount sufficient to form a pH-insensitive, water-soluble dye:polyamine complex that acts like a cationic dye.

Further in accordance with the invention, a method of converting the anionic dye to behave like the cationic dye for formulating an ink-jet ink having a desired pH is provided. The method comprises adding a sufficient amount of the polyamine to form the anionic dye:polyamine complex.

The dye:polyamine complex is a complex of the anionic dye and the polyamine polymer, which itself is cationic. Consequently, this complex behaves as a cationic dye.

The ink-jet inks of the invention show remarkable waterfastness on a variety of common office papers. Further, inks made with the dye:polyamine complex are pH-insensitive and some complexes are completely pH-independent. These inks are thus stable over a wide pH range.

In addition, the ink-jet inks of the present invention exhibit superior ink-to-ink bleed when printed next to a drop of another color ink which contains an anionic polymer or carboxylated colorant and resist crusting or drying in ink-jet nozzles.

BEST MODES FOR CARRYING OUT THE INVENTION

Figure 1:
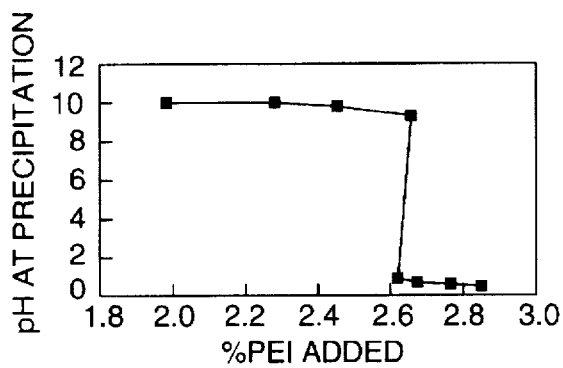
FIGS. 1–9, on coordinates of pH and percent PEI (polyethylenimine) added, are plots depicting the pH at which a dye (Acid Yellow 23) will precipitate in water as a function of PEI concentration.

The present invention takes advantage of understanding the nature of the anionic-cationic polymer interactions, including the nature of dye-polyamine, specifically, dye-polyethylenimine (PEI) interaction(s). It is taught herein how to mix polyamines with anionic dyes in a manner so that sufficient polyamine is complexed to the dye to the point where the dye is held in solution by a "dye:cationic polymer complex" and behaves as a cationic dye. Polyethylenimines are a sub-class of polyamines; however, the two terms are used interchangeably herein.

It is generally believed in the paper and ink industries that cationic dyes are naturally waterfast on paper, probably because paper is anionic in nature, including basic or carbonate paper. The observed waterfastness herein may be the result of the dye:polyamine complex formed in accordance with the teachings of the present invention precipitating when the ink dries on paper. Nevertheless, inks made by the methods disclosed herein show remarkable waterfastness, regardless of the mechanism by which they bind to paper. Indeed, the polyamine-complexed-dyes disclosed herein demonstrate excellent waterfastness on a variety of common office papers.

An important point of these dye:polyamine complexes is that inks made with them are pH-insensitive, and some complexes are completely pH-independent. This pH-independence is also indicative that a truly cationic complexed dye has been formed. Nonetheless, regardless of the accuracy of description of the true molecular species formed, the methods disclosed herein are valid for making ink-jet inks that are stable over a wide pH range, from pH 14 to below pH 0. With some anionic dyes, it is sufficient to form a complex that is stable only down to pH 4 or 5 without being near the precipitation point of the dye-polyamine if the ink maker desires a final ink at pH 7.

One procedure to accomplish the method disclosed herein is as follows: To a dye concentrate is added the necessary amount of polyamine, followed by neutralization to the pH desired for the final ink. If the dye:polyamine complex precipitates, more polyamine is added, which raises the pH to a dissolution point until the complex is dissolved, then the pH is re-adjusted to the desired value. By stepwise adding more polyamine and neutralizing, one will eventually find a point where enough polyamine is complexed to the dye to maintain solubility at low pH. Water is then added to bring the concentrations to two times the dye concentration desired for the final ink. Then, a two-fold mixture of all the final ingredients (humectants, co-solvents, surfactants, salts, biocides) is added, which brings the final ink to the desired concentration.

A second method is similar to the first method, but is less preferable. This second method should only be used if the ink maker has knowledge that a particular dye forms a good soluble dye:polyamine complex. Polyamine is added to an ink concentrate and the pH adjusted down to the desired level, using a suitable pH modifier. Any of the common acids, such as $HNO_3$, HCl, acetic acid, $H_2SO_4$, and the like are suitable pH modifiers, although $Cl^-$ ion may cause corrosion with the materials used in the pen and acetic acid cannot be used below a pH of about 5. If a precipitate forms, more polyamine is added, which raises the pH to a dissolution point, followed another adjustment of the pH to the desired point.

Finally, a third and preferred method is to add polyamine to a 2× concentrate of dye and vehicle ingredients that contribute to the complex. One must use prior experimentation and knowledge of the complex to know which of the desired ink ingredients will contribute to the dye:polyamine complex. However, such experimentation is not considered to be undue. The pH is adjusted as above and the final ink ingredients are added in water to make a final ink of the desired concentration. An important point of these directions is that acid is always added to a dye:polyamine mixture. Never is polyamine added to a dye possessing enough acid to maintain a final pH because during early addition, there will not be enough polyamine present to form a soluble complex and a gummy precipitate will form, requiring time to dissolve after sufficient polyamine is added.

The inks disclosed here are thermodynamically stable solutions. Should precipitation occur due to mixing errors as described above, this precipitation will re-dissolve with stirring, although it may take considerable time. For example, PEI was added to an ink containing 2% Acid Yellow 23 and possessing enough acid to maintain the final ink at pH 5 (PEI is basic). Upon initial addition of PEI, precipitation occurred. After bringing the PEI level up to 2%, the precipitation remained as a sticky, gummy glob in the ink, convincing an observer that the ink was ruined. After stirring for several hours at room temperature, the glob was dissolved, resulting in a stable ink. This proves that the final thermodynamic equilibrium for a properly made ink with sufficient PEI lies in the direction of solubilized dye at low pH.

Examples and proof of formation of these complexes can be seen in FIGS. 1–9. These Figures were generated by measuring the pH at which precipitation would form during pH lowering in a given percentage of PEI as part of a dye-PEI solution, employing the dye known as Acid Yellow 23 (denoted herein as "AY23") to demonstrate the efficacy of the methods of the present invention. The absorbency listed in the Figures is at 428 nanometers (nm) of the final solution diluted 10,000 fold. The Table below summarizes the conditions employed.

Figure 2:
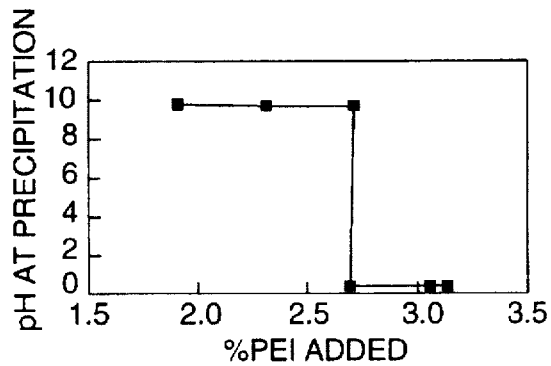
Figure 3:
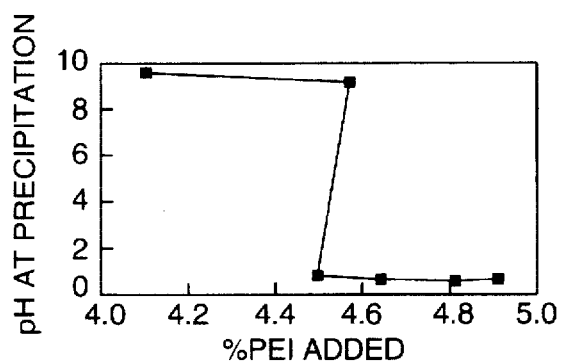
Figure 4:
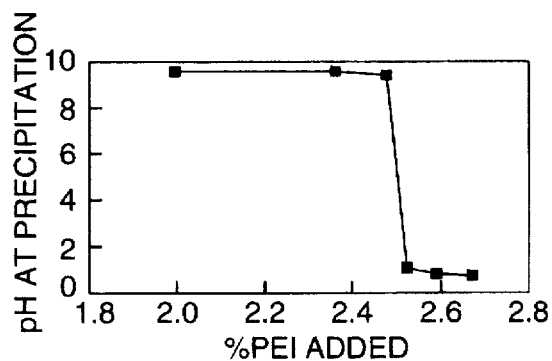
Figure 5:
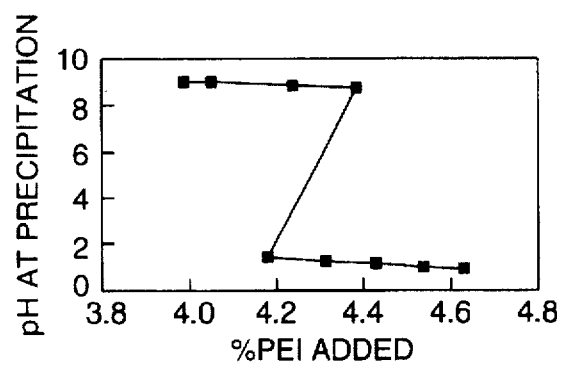
Figure 6:
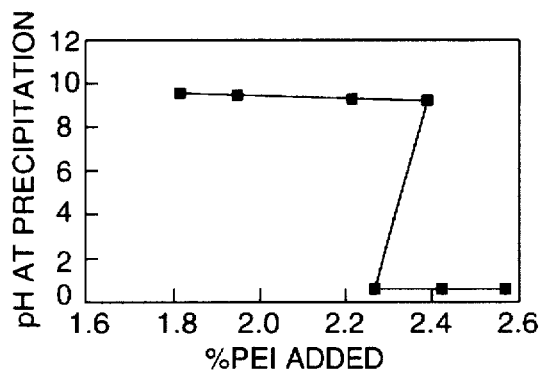
Figure 7:
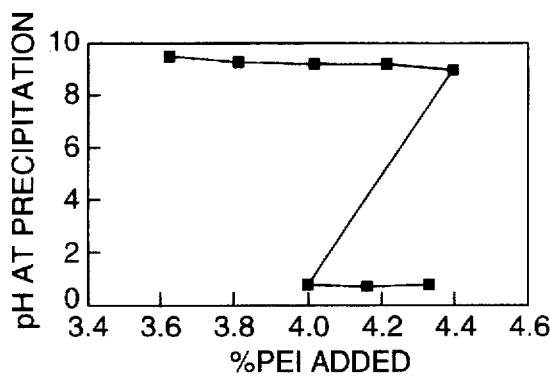
Figure 8:
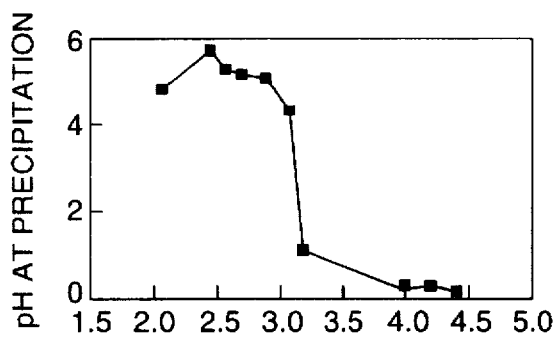
Figure 9:
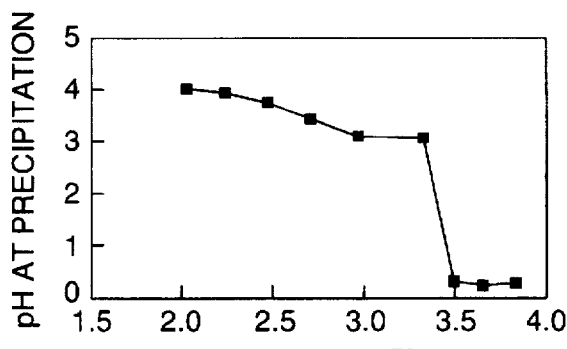

| RELATIONSHIP OF FIGS. TO INK COMPOSITIONS | |
|---|---|
| PLOT | CONDITIONS |
| FIG. 1 | AY23 (abs. = 0.1) in water + PEI (MW = 50K) |
| FIG. 2 | PEI (MW = 50K) added to AY23 (abs. = 0.1) in water |
| FIG. 3 | PEI (MW = 50K) added to AY23 (abs. = 0.2) in water |
| FIG. 4 | PEI (MW = 50K) added to AY23 (abs. = 0.1) in 20 wt % 1,5-pentanediol |
| FIG. 5 | PEI (MW = 50K) added to AY23 (abs. = 0.2) in 20 wt % 1,5-pentanediol |
| FIG. 6 | PEI (MW = 50K) added to AY23 (abs. = 0.1) + 1.25 wt % OOAO + 20 wt % 1,5-pentanediol in water |
| FIG. 7 | PEI (MW = 50K) added to AY23 (abs. = 0.2) + 1.25 wt % OOAO + 20 wt % 1,5-pentanediol in water |
| FIG. 8 | TEPA added to AY23 (abs. = 0.1) + 1.25 wt % OOAO + 20 wt % 1,5-pentanediol in water |
| FIG. 9 | TEPA added to AY23 (abs. = 0.2) + 1.25 wt % OOAO + 20 wt % 1,5-pentanediol in water |

Notes:
PEI was from Aldrich Chemical, having a molecular weight (MW) of 50,000;
TEPA is tetraethylenepentamine, available from Dow Chemical;
OOAO is cis-9-octadecenylamine oxide;
abs. = absorbance parameter is the absorbance in a 1.0 cm cell after dilution of 10,000:1.

FIGS. 1 and 2 show the pH at which a mixture of AY23 and PEI (available from Aldrich Chemicals; MW =50K) in water will precipitate and has a sudden change at 2.6% PEI. Doubling the dye's concentration requires a concomitant increase in PEI concentration of about 70% (FIG. 3). In another experiment, reducing the dye's concentration to an absorbency of 0.06 at 428 nanometers with 10,000 fold dilution required 1.7% PEI to achieve pH independence. Thus, reducing the dye by half allows a concomitant reduction in PEI of 65%.

The presence of an organic co-solvent (1,5-pentanediol) has a small stabilizing effect on the complex's equilibrium (FIGS. 4 and 5), but the addition of the surfactant oleoylamine oxide (OOAO, or cis-9-octadecenylamine oxide, also known as N,N-di-methyl-N-(9-octadecyl)-N-amine oxide) has a large stabilizing affect (FIGS. 6 and 7). The break in these curves where pH independence is obtained is proof that a thermodynamically stable, cationic complex is being obtained. Nonetheless, by this method, stable inks can be made to any pH desired by the ink maker and the resulting print on paper will not bleed into adjacent ink containing anionic polymers, and the print from these inks is waterfast.

Generally, cationic surfactants cannot be used to make ink-jet inks which utilize anionic dyes due to their mutual incomparability in solution, which causes spontaneous precipitation. Carboxylated and sulfonated dyes which are the most common and readily available water-soluble dyes, are anionic dyes. However, if anionic dyes are complexed to PEIs by the methods of this invention, then cationic surfactants are easily compatible with the dye:PEI complexes. Examples of cationic surfactants used to make stable inks by this invention are the Adogen series from Sherex Corp. (Dublin, Ohio), for example, Adogen 461, which is an alkyl quaternary ammonium chloride, Carspray 300 from Sherex Corp., and the Jet Quat series from JETCO, which are also alkyl quaternary ammonium chlorides. Also, amine oxide surfactants, which are zwitterionic surfactants, such as oleoylamine oxide, at pH below about 5.5 precipitate anionic dyes, but such precipitation is prevented by the methods of this invention.

Alternatively, non-ionic surfactants, such as secondary alcohol ethoxylates, may be used in the practice of the present invention. Examples of such secondary alcohol ethoxylates include Tergitol 15-S-5 and Tergitol 15-S-7, available from Union Carbide Co.

The foregoing description of the present invention is applicable to PEIs ranging in molecular weight from 103 (diethylenetriamine) to molecular weights as high as practical and has been demonstrated at molecular weights of 146 to 50,000 (FIGS. 1–7). FIGS. 8 and 9 show this method using tetraethylenepentamine (TEPA, MW=189). Since Applicants have demonstrated complexation of PEIs to dye over a molecular weight range of 103 to 50,000 PEI, it can be concluded that this method works for all molecular weights of polyamine. This method is not limited to polyethylenimaine-type polymers. Other polyamine polymers will work, such as Jeffamines, available from Texaco.

The examples in FIGS. 1–9 all employed AY23. However, the teachings of the present invention are also applicable with other dyes. Inks have been demonstrated with Acid Blue 9, Acid Red 52, and Direct Yellow 86. Graphs with cyan and magenta are not easy to generate, due to the opacity of these inks. Two percent PEI is sufficient to stabilize inks utilizing Acid Blue 9 at an absorbency parameter of 0.3 at 630 nanometers after diluting 10,000 fold. With Acid Red 52, the presence of OOAO greatly contributes to the formation of the PEI-dye complex.

The dye:polyamine ratio does not appear to be particularly critical, and may range from 1:1 to 1:10 (wt % basis, regardless of polyamine molecular weight). The higher ratio is employed at the lower dye concentrations. It appears that the polyamine becomes more efficient at suspending dyes at higher concentrations. Preferably, the ratio is in the range of 1:2 to 1:4. For example, at dye concentrations for inks used in Hewlett-Packard's DeskJet 850C and 855C printers, the ratio is about 1:2, dye:PEI.

The ink for the DeskJet 850C and 855C printers has more than double the dye concentration as the regular inks or inks for the DeskJet 550C printer above. The concentration of the yellow dyes is in the range of about 0.1 to 0.2 absorbance parameter (defined as absorbance in a 1.0 cm cell after 10,000:1 dilution), while the range of cyan dyes is in the range of 0.1 to 0.3 absorbance parameter and the range of magenta dyes is also in the range of 0.1 to 0.3 absorbance parameter. Dye can be suspended at supposedly any concentration, as long as one uses enough polyamine.

The inks for the DeskJet 550C printer have an absorbance parameter in the range of about 0.05 to 0.2 for the yellow ink, about 0.2 to 0.4 for the cyan ink, and about 0.18 to 0.4 for the magenta ink.

The vehicles used in conjunction with the polyamines include a water-miscible organic co-solvent. Examples of suitable organic co-solvents include diols, polyols, and glycols. Examples of glycols include, but are not limited to, ethylene glycol, diethylene glycol, triethylene glycol, tetra-ethylene glycol, propylene glycol, polyethylene glycol, polypropylene glycol, thiodiglycol, and derivatives thereof, examples of diols include, but are not limited to, propanediol, butanediol, pentanediol, hexanediol, and homologous diols. Additional co-solvents may also be employed, such as glycol esters; long chain alcohols such as butyl alcohol, pentyl alcohol, and homologous alcohols; and other low vapor pressure, water-miscible solvents such as esters; ketones; lactones such as γ-butyrolactone; lactams such as N-pyrrolidone, 2-pyrrolidone, and N-(2-hydroxyethyl) pyrrolidone; and glycerols and their derivatives. Specific preferred organic co-solvents include 1,5-pentanediol, 2-ethyl-2-(hydroxymethyl)-1,3-propane-diol, ethylene glycol, diethylene glycol, thiodiglycol, 2-pyrrolidone, and N-methyl pyrrolidone.

EXAMPLES

The polyamine complexes disclosed herein can be used in any ink system. They were developed and used mostly in certain of Hewlett-Packard's DeskJet® inks. In one ink, used in the DeskJet 850C Printer, the polyamine complex was used to replace the salt (calcium nitrate or magnesium nitrate used for black to color bleed control), and impart waterfastness. In another ink, used in the DeskJet 550C Printer (two pens), these ink formulations would stop the black to color bleed, which was normally controlled through the software of the printer, but the main advantage in these inks was waterfastness.

These complexes were also formed in an ink containing tetrafluoropropanol (TFP), which is the subject of a separate patent application (Ser. No. 08/738,531 filed on Oct. 28, 1996. However, since TFP inks leave all the dye on the surface of the paper, waterfastness was not total, but was improved over inks without high molecular weight polyamines.

Some example formulations are:

DYE SET AND VEHICLE FOR DESKJET 550C PRINTER

|  | magenta | cyan | yellow |
|---|---|---|---|
| DYE: | AR52:Li+ | AB9:Na+ | AY23:TMA |
| Approx. wt % | 1.3 | 1.8 | 0.43 |
| Absorbance Parameter | 0.21 | 0.25 | 0.05 |
| Wavelength | 566 nm | 630 nm | 428 nm |
| pH | 6–7 | 6–7 | 6–7 |

Notes: AR52:Li+ is Acid Red 52 with lithium counterion;
AB9:Na+ is Acid Blue 9 with sodium counterion;
AY23:TMA is Acid Yellow 23 with tetramethyl ammonium counterion;
absorbance parameter is the absorbance measured in a 1.0 cm cell after 10,000:1 dilution in all cases.

VEHICLES:

| 1. TEPA (tetraethylenepentamine) | 1.8 to 2.0 wt % |
|---|---|
| OOAO | 1 wt % |
| 1,5-pentanediol | 10 wt % |
| Nuocept C | 0.3 wt % |
| 2. TEPA | 1.8 to 2.0 wt % |
| OOAO | 1 wt % |
| 2-pyrrolidone | 10 wt % |
| Nuocept C | 0.3 wt % |
| 3. TEPA | 1.8 to 2.0 wt % |
| OOAO | 1 wt % |
| thiodiglycol | 7.5 wt % |
| 2-pyrrolidone | 7.5 wt % |
| Nuocept C | 0.3 wt % |
| 4. TEPA | 1.8 to 2.0 wt % |
| OOAO | 1 wt % |
| thiodiglycol | 7.5 wt % |
| Nuocept C | 0.3 wt % |
| 5. TEPA | 1.8 to 2.0 wt % |
| Sherex Carspray 300 | 0.75 wt % |
| Sherex Adogen 461 | 2 wt % |
| 1,5-pentanediol | 10 wt % |
| Nuocept C | 0.3 wt % |

Notes: OOAO is N,N-dimethyl-N-(9-octadecenyl)-N-amine oxide.
Nuocept C is a microbial reagent available from Nudex, Inc., a division of Huls America.
Carspray 300 and Adogen 461 are cationic surfactants sold by Sherex Corp. (Dublin, OH).

An example of an ink using cationic surfactants is shown in vehicle #5 above.

DYE SET AND VEHICLE FOR DESKJET 850C and 855C PRINTERS

|  | magenta 1 | magenta 2 | cyan 1 | cyan 2 | yellow |
|---|---|---|---|---|---|
| DYE: | AR52:Li+ | RR180 | AB9:Na+ | DB199:TMA | AY23:TMA |
| Approx. wt % | 1.25–1.5 | 2.25–3.0 | 1.05–1.4 | 1.8–2.4 | 2.2–2.75 |
| Abs. Param. | 0.135 | 0.09 | 0.158 | 0.09 | 0.128 |
| Wavelength | 566 nm | 510 nm | 630 nm | 618 nm | 428 nm |

Notes: AR52:Li+ is Acid Red 52 with lithium counterion
RR180 is Reactive Red 180
AB9:Na+ is Acid Blue 9 with sodium counterion
DB199:TMA is Direct Blue 199 with tetramethyl ammonium counterion
AY23:TMA is Acid Yellow 23 with tetramethyl ammonium counterion
Abs. Param. is the absorbance parameter in a 1.0 cm cell after 10,000 dilution in all cases

VEHICLES:

| 1. PEI or TEPA | 3 to 4 wt % |
|---|---|
| Tergitol 15-S-5 | 2.0 wt % |
| EHPD (ethylhydroxypropanediol) | 7.5 wt % |
| 2-pyrrolidone | 7.5 wt % |
| 1,5-pentanediol | 8. wt % |
| Proxel GXL | 0.2 wt % |
| 2. PEI or TEPA | 3 to 4 wt % |
| Tergitol 15-S-5 | 1.0 wt % |
| Tergitol 15-S-7 | 1.5 wt % |
| EHPD | 8. wt % |
| 2-pyrrolidone | 4 wt % |
| DEG (diethylene glycol) | 4 wt % |
| Proxel GXL | 0.2 wt % |
| 3. PEI or TEPA | 3 to 4 wt % |
| OOAO | 1.25 wt % |
| EHPD | 7.5 wt % |
| 2-pyrrolidone | 7.5 wt % |

| | |
|---|---|
| 1,5-pentanediol | 8. wt % |
| Proxel GXL | 0.2 wt % |

Notes: Tergitol 15-S-5 and 15-S-7 are secondary alcohol ethoxylates, which are non-ionic surfactants, available from Union Carbide Co. (Houston, TX).
Proxel GXL is a microbial reagent, available from ICI America (Wilmington, DE).

Summarizing, PEI appears to work in every ink tried, provided one puts in enough PEI to suspend the dyes in the particular ink system. The amount of PEI necessary to suspend the dyes is dependent upon the surfactant, its amount, and slightly upon the amount of solvent used.

Most of the polyamines employed in the practice of the present invention are polymers containing units which can be called ethylamine, and can be considered made from ethyleneimine. The following polyamines have been successfully used in the practice of this invention: diethylentriamine (which did not work as well as higher molecular weights), triethylenetetramine, tetraethylenepentamine (this one has been used the most of any amine or polyamine), and Dow E-200 (which is approximately pentaethylenehexamine, but non-linear and not completely uniform); PEI ranging from molecular weight of 146 to 5 million; (these came in steps of 600, 700, 800, 1200, 1,800, 2,000, 4,000, 10K, 50K, 750K, and 5 million, but 50K was primarily used); BASF Polymin FG, BASF Polymin P, BASF Polymin G-35, BASF "waterfree Polymin 187701"; Jeffamine D-2, Jeffamine T-403, Jeffamine ED-600, Jeffamine ED-900, and Jeffamine ED2001 (Jeffamines are available from Texaco); ethyleneoxide-modified PEI; epichlorohydrin-modified PEI. Other polyamines include purified chitosan and a stable dye complex using a 10K molecular weight polymer of poly(N,N-dimethylamino-2-ethyl methacrylate).

The vehicle contributes to complex stability slightly, as can be seen by comparing FIG. 2 with FIG. 4 and by comparing FIG. 3 with FIG. 5. Adding solvent (20% 1,5-pentanediol) decreases the amount of PEI necessary to solubilize dye (by only a small amount), from 2.7% to 2.5% (FIGS. 2 and 4) and from 4.47% to 4.16% (FIGS. 3 and 5). Considering some equations one could write for complex formation, one would expect solvent to have only a small effect as observed.

Likewise, by comparing FIGS. 2 and 4 with FIG. 6 and by comparing FIGS. 3 and 5 with FIG. 7, one can see that the surfactant OOAO also has a small effect on stabilizing the dye:PEI complex.

It is not yet known why solvent and/or OOAO help stabilize the dye:PEI complex. Without subscribing to any particular theory, it is possible that, when PEI attaches to dye, thereby neutralizing the charge of the anionic dye, a non-charged (or low charged) organic molecule is first formed which is soluble in organic solvents. The precipitate in aqueous systems is probably rich in this non-charged (or low charged) organic complex. Enough PEI must then be added to form enough positive charge to carry the complex into solution.

INDUSTRIAL APPLICABILITY

The addition of polyamines to anionic dyes to form a pH-insensitive, water-soluble dye:polymer complex that acts like a cationic dye is expected to find use in ink-jet inks, particularly for thermal ink-jet printers.

Thus, there has been disclosed pH-insensitive, water-soluble anionic dye:polymer complexes formed from polyamines and polyethylenimine polymers that act like cationic dyes. It will be apparent to those skilled in this art that various changes and modifications of an obvious nature may be made, and all such changes and modifications are considered to fall within the scope of the present invention.

What is claimed is:

1. An ink-jet ink for ink-jet printers comprising:
   (a) an aqueous-based vehicle; and
   (b) an anionic dye complexed with a polyamine in an amount sufficient to form
   a pH-insensitive, water-soluble dye:polyamine complex that acts like a cationic dye.

2. The ink-jet ink of claim 1 wherein said anionic dye is selected from the group consisting of sulfonated and carboxylated dyes.

3. The ink-jet ink of claim 1 wherein said polyamine consists essentially of a polyethylenimine.

4. The ink-jet ink of claim 3 wherein said polyethylenimine has a molecular weight of greater than about 100.

5. The ink-jet ink of claim 4 wherein said polyethylenimine is selected from the group consisting of diethylenetriamine, triethylenetetramine, tetraethylenepentamine, pentaethylenehexamine, ethyleneoxide-modified polyethylenimine, and epichlorohydrin-modified polyethylenimine.

6. The ink-jet ink of claim 1 wherein said polyamine is selected from the group consisting of chitosan and poly(N,N-dimethylamino-2-ethyl methacrylate).

7. The ink-jet ink of claim 1 wherein said vehicle includes a water-miscible organic co-solvent.

8. The ink-jet ink of claim 7 wherein said organic co-solvent is selected from the group consisting of diols, polyols, glycols, and lactams.

9. The ink-jet ink of claim 8 wherein said organic co-solvent is selected from the group consisting of 1,5-pentanediol, 2-ethyl-2-(hydroxymethyl)-1,3-propanediol, ethylene glycol, diethylene glycol, thiodiglycol, 2-pyrrolidone, and N-methyl pyrrolidone.

10. The ink-jet ink of claim 1 wherein said vehicle includes a cationic, zwitterionic, or non-ionic surfactant.

11. The ink-jet ink of claim 10 wherein said zwitterionic surfactant consists essentially of N,N-dimethyl-N-(9-octadecenyl)-N-amine oxide.

12. The ink-jet ink of claim 10 wherein said non-ionic surfactant consists essentially of a secondary alcohol ethoxylate.

13. The ink-jet ink of claim 1 wherein said dye:polyamine complex is in a ratio within the range of 1:1 to 1:10.

14. The ink-jet ink of claim 15 wherein said dye:polyamine ratio is within the range of 1:2 to 1:4.

15. A method of converting an anionic dye to a species that acts like a cationic dye for formulating an ink-jet ink having a desired pH, said ink-jet ink comprising said converted anionic dye and an aqueous-based vehicle, said method comprising combining a sufficient amount of a polyamine with said anionic dye to form a pH-insensitive, water-soluble dye:polyamine complex that acts like said cationic dye.

16. The method of claim 15 comprising:
   (a) providing a concentrate of said anionic dye;
   (b) adding said sufficient amount of said polyamine to said dye to form said pH-insensitive, water-soluble, dye:polyamine complex;
   (c) adding a sufficient amount of a pH-modifier to said dye:polyamine complex to a level equal to said pH of said ink-jet ink;

(d) repeating steps (b) and (c) as necessary if a precipitate forms such that enough polyamine is complexed to said anionic dye to maintain solubility of said dye-:polyamine complex in said vehicle;

(e) adding sufficient water to form a concentration of said dye:polyamine complex that is twice that desired for said ink-jet ink; and (f) adding a two-fold mixture of non-water components of said vehicle to form said ink-jet ink.

17. The method of claim 15 comprising:

(a) providing a concentrate of said ink-jet ink;

(b) adding said polyamine to said concentrate to form said dye:polyamine complex;

(c) adding a sufficient amount of a pH-modifier to said concentrate to obtain said ink-jet ink having said desired pH; and (d) repeating steps (b) and (c) as necessary if a precipitate forms.

18. The method of claim 15 comprising:

(a) providing a two-fold concentrate of said anionic dye and any components of said vehicle that contribute to forming said dye:polyamine complex;

(b) adding said polyamine to said two-fold concentrate;

(c) adding a sufficient amount of a pH modifier to said two-fold concentrate to obtain said ink-jet ink having said desired pH; and (d) adding water and any components of said vehicle that do not contribute to forming said complex to form said ink-jet ink.

19. The method of claim 15 wherein said vehicle includes a water-miscible organic co-solvent.

20. The method of claim 15 wherein said vehicle includes a cationic, zwitterionic, or non-ionic surfactant.

21. The method of claim 15 wherein said dye:polyamine complex is formed in a ratio within the range of 1:1 to 1:10.

22. The method of printing an ink-jet ink on a medium, said ink-jet ink comprising an aqueous-based vehicle and at least one anionic dye, said method comprising (a) complexing said anionic dye with a polyamine in an amount sufficient to form a pH-insensitive, water-soluble dye:polyamine complex that acts like a cationic dye and (b) printing said ink-jet onto said medium.

23. The method of claim 22 wherein said dye:polyamine complex is formed in a ratio within the range of 1:1 to 1:10.

* * * * *